United States Patent [19]
Carsten et al.

[11] Patent Number: 5,588,637
[45] Date of Patent: Dec. 31, 1996

[54] AUXILIARY AUTOMATIC VALVE SHUT-OFF SYSTEM

[75] Inventors: Robert L. Carsten, 1098 Redding, Costa Mesa, Calif. 92626; Bernard E. Wilberger, Orange, Calif.

[73] Assignee: Robert L. Carsten, Costa Mesa, Calif.

[21] Appl. No.: 453,643

[22] Filed: May 30, 1995

[51] Int. Cl.$^6$ .................................. F16K 31/02
[52] U.S. Cl. .............................. 251/129.03; 251/129.13; 318/466
[58] Field of Search ............... 251/129.03, 129.13, 251/129.11; 318/466, 286

[56] References Cited

U.S. PATENT DOCUMENTS

| | | | |
|---|---|---|---|
| 2,550,906 | 5/1951 | Britton | 137/139 |
| 4,220,313 | 9/1980 | Petersen et al. | 251/129.03 X |
| 4,541,609 | 2/1985 | Smith | 251/129.03 |
| 4,647,007 | 3/1987 | Bajka | 251/129.03 |
| 4,754,949 | 7/1988 | Fukamachi | 251/129.03 |
| 4,760,989 | 8/1988 | Elliott et al. | 251/129.03 |
| 4,790,514 | 12/1988 | Marks | 251/129.03 |
| 4,845,416 | 7/1989 | Scholl et al. | 251/129.11 X |
| 4,875,623 | 10/1989 | Garris | 251/129.13 X |
| 4,889,315 | 12/1989 | Imanaga | 251/129.03 |
| 5,372,351 | 12/1994 | Oliver | 251/129.03 X |

OTHER PUBLICATIONS

"Emergency Shut Off Facilities for Tank Car and Tank Truck Transfer of Chlorine", *The Chlorine Institute, Inc.*, (Pamphlet #57A) Ediition 2, May 1989.

"Automated Chlorine Cylinder Block Valve", –Powell Fabrication & Manufacturing, Inc., undated.

*Primary Examiner*—Hoang Nguyen
*Attorney, Agent, or Firm*—Klein & Szekeres, LLP

[57] ABSTRACT

A shut-off system for a filling/dispensing valve of a compressed gas cylinder includes an electric motor that rotates the valve stem through a clutch. The clutch operatively couples the motor to the stem to allow the stem to be either motor-turned or manually-turned only in the valve-closing direction, and selectively decouples the motor from the stem to allow manual rotation of the stem in either direction. An actuation signal is fed to a microprocessor to turn the motor on in response to a predetermined condition. During motor operation, a voltage sensor generates a control signal having a value indicative of the voltage across the switch, which value is inputted to the microprocessor. The microprocessor has a stored value representing the resistance across the closed switch, and it thus can compute the instantaneous value of the current drawn by the motor, which is periodically compared with a stored maximum current value. As the valve begins to abut against the valve seat, the motor torque required for further incremental rotation of the valve stem increases abruptly, thereby causing a correspondingly abrupt increase in the current drawn by the motor. When this abrupt increase in motor current exceeds the stored maximum current value, the microprocessor generates a second switching signal after a short delay, opening the switch to turn the motor off.

42 Claims, 4 Drawing Sheets

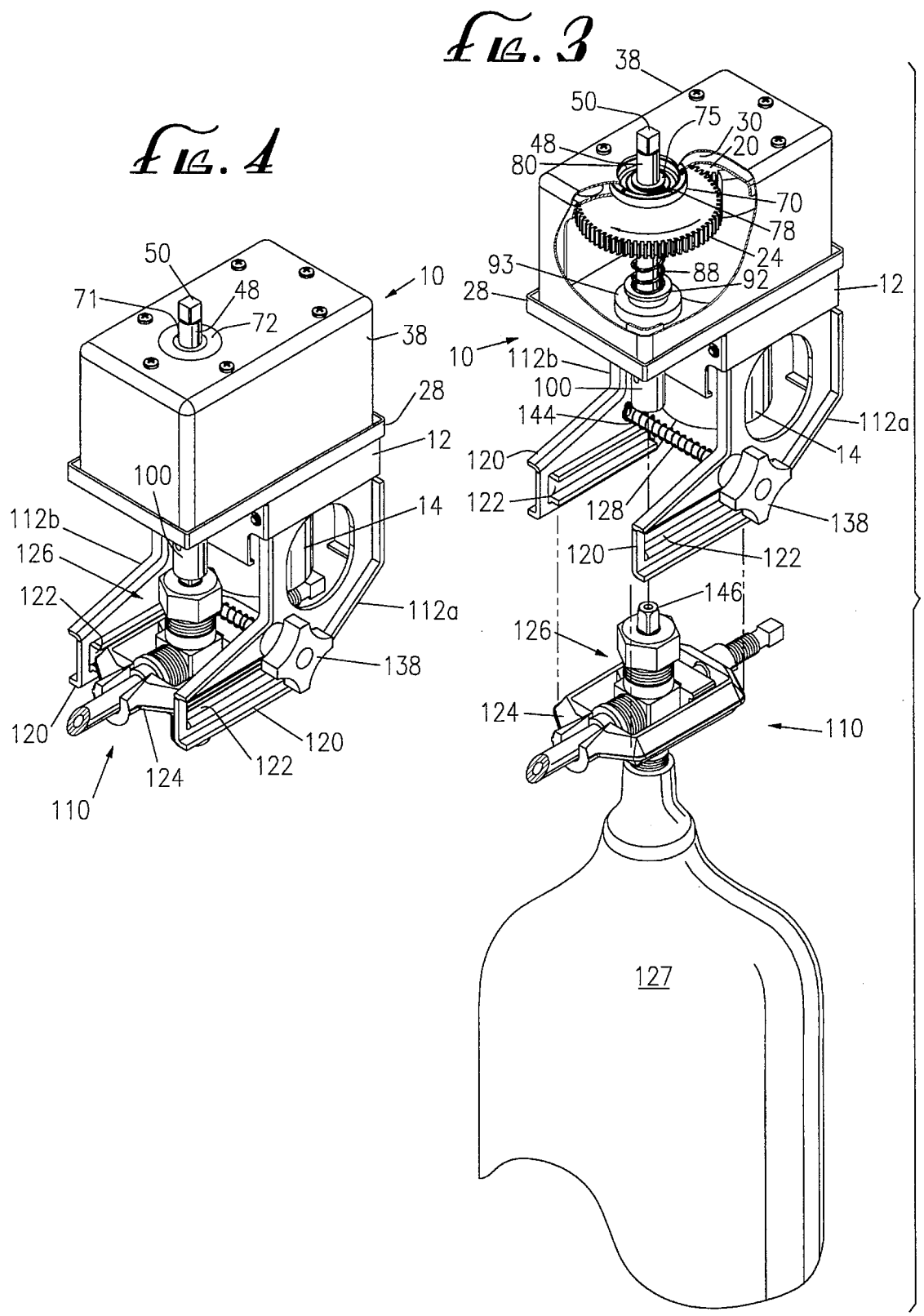

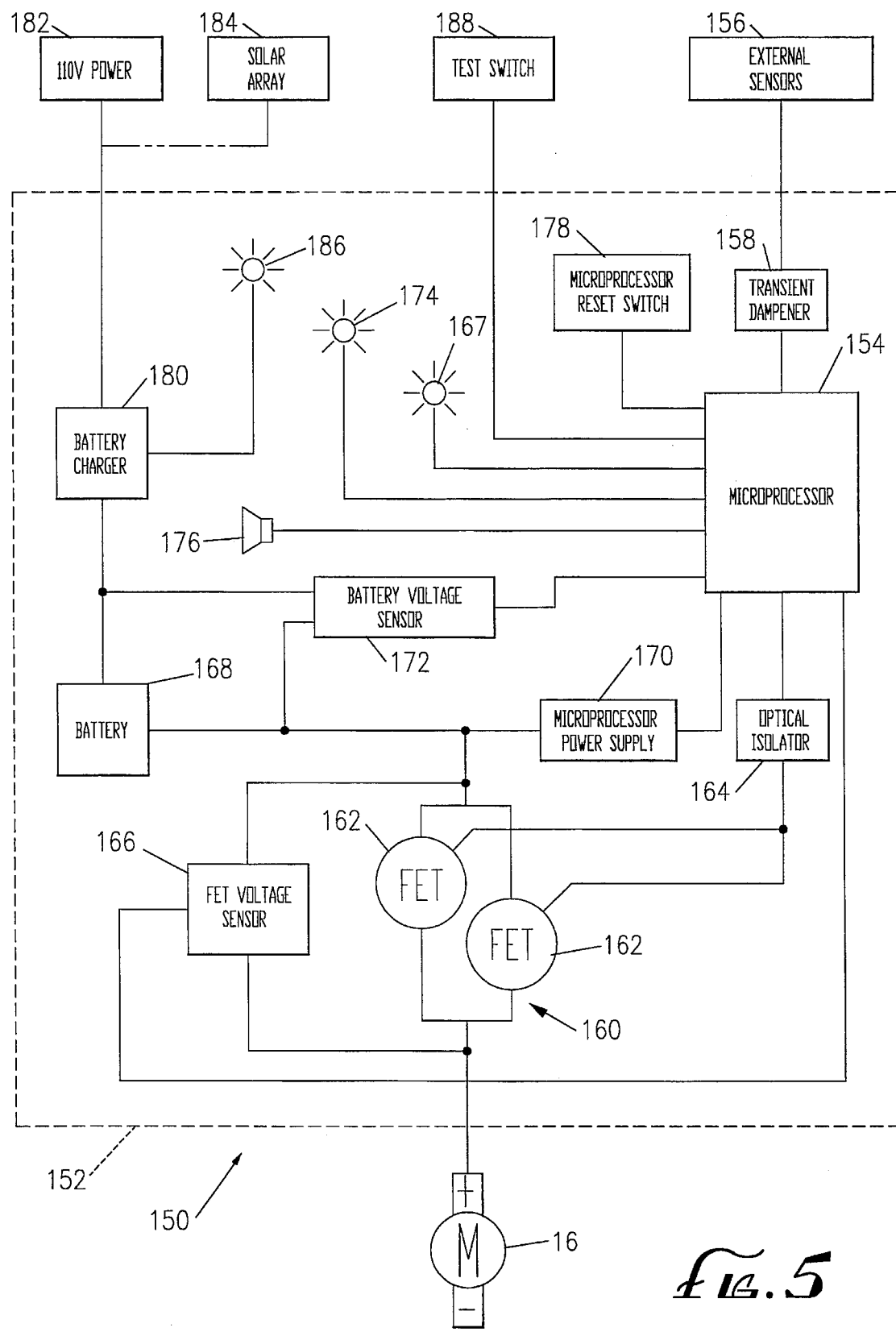

AUXILIARY AUTOMATIC VALVE SHUT-OFF SYSTEM

BACKGROUND OF THE INVENTION

This invention relates generally to the field of valve actuation devices and systems for use with pressurized fluid containers. More particularly, it relates to an actuation system that provides automatic shut-off, under prescribed conditions, of a fluid flow control valve that is normally actuated manually.

Hazardous or toxic chemicals, such as, for example, chlorine and sulfur dioxide, are widely distributed in pressurized containers for use in water purification, sewage treatment, and a variety of industrial and agricultural applications. Many of these chemicals are immediately toxic to humans, even in very low concentrations. Accordingly, the containers, valves, and fittings, as well as the transportation, filling and dispensing procedures used with these chemicals are strictly regulated in the United States by the U.S. Department of Transportation (DOT). Such equipment and procedures are subject to regulatory regimens in other countries as well.

The valves used in filling and dispensing from such containers are designed to be operated manually. Therefore, the attendance of an operator who is properly equipped, trained, and certified is required for hooking up and disconnecting the container for the filling and dispensing operations. The containers are, however, routinely left unattended for extended periods of time while connected to the process piping during filling and dispensing. Indeed, the chemicals in these containers are typically employed in applications requiring very low dosage rates (e.g., in ratios of the chemical to the treated fluid measured in a few parts per million). Thus, it may take days, weeks, or even months for the contents of such containers to be completely discharged.

If there is any leakage at the filling/dispensing valve or downstream from it during the filling or dispensing operations, the toxicity of the chemicals involved will usually preclude the approach of an operator or technician without protective breathing apparatus and protective clothing. Therefore, some mechanism is needed for promptly closing the valve, either from a remote location, or automatically in response to the leak. This is especially true for many small water treatment sites that employ pressurized chlorine cylinders, because such sites are not regularly staffed by a skilled technician, and they are often located in or near residential neighborhoods, in which an unabated toxic chemical leak can have disastrous consequences.

The approved containers and filling/dispensing systems for the storage and distribution of toxic chemicals (particularly chlorine, sulfur dioxide, and related chemicals) fall into two general categories, based on container capacity (measured by weight): (a) Bulk shipping containers for tanker trucks (typically about 17 tons or 15,000 kg), rail cars (typically 50–90 tons or 45,000–82,000 kg), barges (up to several hundred tons or several hundred thousand kg), and stationary vessels (typically about 25–200 tons or 23,000–182,000 kg); and (b) smaller "application" containers that are easily transportable to an application site, including "cylinders" ranging from about 50–150 lb (23–68 kg), and "tons", containing 2000 lb (900 kg).

Currently, two basic types of systems are in use for the remote or automatic operation of the valves of the bulk containers. A first such prior art system employs a battery-operated actuator that is designed specifically for rail car tank valves. In this system, a battery, a motor, a gear reduction assembly, and the manual and electronic controls are installed in a single enclosure that sits astride the valve within the armored dome of the tank car. The entire system typically weighs about 60–80 lb. (27–36 kg), and it is specifically designed for the rail car tank valves. Because of its large size and the specialization of the design for rail tank car valves, this system is not suitable for use with the valves of the smaller application containers.

The other major type of prior art system, also especially adapted for rail car tank valves, employs a compressed air-driven valve actuator, which must be removed from the valve to operate the valve manually. Like the previously described system, it is not suitable for use with application container valves. Moreover, compressed air requires dehumidification and filtering to avoid freezing, corrosion, and particulate contamination, all of which can damage the system or cause it to malfunction. Such systems typically also require some mechanism for converting electrical signals to pneumatic signals, and vice versa. Accordingly, compressed air systems are typically quite complex, bulky, and expensive.

Both of the above-described prior art valve actuation systems may be operated either to open or close the valve. Accordingly, inadvertent operation of the system to open the valve when it is not safe to do so is possible.

The need has therefore been recognized for a valve actuation system that provides for emergency automatic, remote shut-off of a valve that can be opened only manually. A system that performs an emergency shut off function for bulk container valves is described in an article entitled "Emergency Shut Off Facilities for Tank Car & Tank Truck Transfer of Chlorine" (Pamphlet #57), published by the Chlorine Institute, Inc., Washington, D.C., in 1989. This system does not operate on the filling/dispensing valve, but rather requires a separate, pneumatically-actuated valve downstream from the filling/dispensing valve. By appropriately scaling down the size of the system's components, this system has been adapted for use with application containers. A disadvantage of this type of system is that it may not be adequately responsive to leaks that occur upstream from the emergency shut-off valve, and particularly at the filling/dispensing valve, which is an area of primary concern for leakage, due to the manipulation of the filling/dispensing valve and its associated fittings whenever a container is replaced. Another disadvantage stems from the possibility that, after the actuation of the emergency shut-off valve, the filling/dispensing valve may be manually closed. Where the system is used for a cryogenic liquid, this circumstance may lead to the trapping of the cryogenic liquid between the two valves without room for expansion, thereby possibly leading to an unsafe condition.

An automatic valve actuation system for closing the filling/dispensing valve of an application container is disclosed in U.S. Pat. No. 4,647,007—Bajka. This system includes a rotary valve actuator that is selectively engaged with and disengaged from an electric motor drive train. Disengagement is accomplished by the axial movement of a hand lever or wheel attached to an extension of the valve stem. Once a mode of operation, either manual or automatic, is selected by the operator, the alternative mode is effectively disabled. Should the manual mode be selected and the system left unattended, emergency shut-off in the automatic mode would not be possible.

In summary, the automatic or remote gas valve actuation systems representing the current state of the art suffer from one or more of the following shortcomings:

(1) The system is not adaptable (by virtue of size or design) to installation on application containers (tons and cylinders);

(2) The system is not serviced by an uninterruptable power supply that can be easily replenished from a readily available source, such as a 110 volt AC power supply;

(3) A compressed air source is required for pneumatic actuation, thereby adding to the cost and complexity;

(4) The manual mode of operation is disabled or interfered with;

(5) A reliable, automatic mechanism for returning from the manual mode to the "armed and ready" emergency automatic mode is lacking;

(6) The emergency shut off valve is located downstream from the filling/dispensing valve, and thus may be less than optimally responsive to leaks at the filling/dispensing valve and its associated fittings, and/or the downstream location may make the system prone to gas trapping between the filling/dispensing valve and the emergency shut off valve; and (7) The system may be inadvertently operated to open the filling/dispensing valve automatically.

There has therefore been an as-yet unfulfilled need for an emergency gas valve shut off system that has none of the above-listed disadvantages, and yet that is economically manufactured and easily installed and used.

SUMMARY OF THE INVENTION

Broadly, the present invention is an automatic gas valve shut off system, operable directly on the filling/dispensing valve of an application-sized compressed gas cylinder, that provides valve closure only when operated in an automatic mode, without disabling or otherwise affecting the manual mode of operation of the valve.

More specifically, the present invention is an auxiliary or emergency valve shut-off system, comprising a battery-powered electric motor that operates on the standard valve stem through a gear drive and a clutch, whereby the clutch allows the valve stem to be decoupled from the motor to allow manual operation of the valve. The clutch automatically recouples the valve stem to the motor when the valve is manually opened, thereby returning the system to its automatic closure mode of operation.

Actuation of the shut-off function is initiated in response to an actuation signal generated by a sensing device, that may be, for example, a gas sensor that detects a leak from the container at the valve, a seismic sensor, a fire or heat detector, or a radio signal generated by an operator-actuated remote control "kill button". The actuation signal is fed into a microprocessor, which then transmits a switching signal, having a first value, to a field effect transistor (FET) switch (or an equivalent switching mechanism), closing the switch to feed current to the motor from the power supply.

The system also includes a mechanism for preventing motor and valve damage due to the continued application of motor current after the valve has been closed. During motor operation, a voltage sensor determines the voltage across the FET switch, and generates a control signal, having a value indicative of the voltage across the switch, that is inputted to the microprocessor. The microprocessor has a stored value representing the resistance across the closed FET switch, and it thus can compute the instantaneous value of the current drawn by the motor. This instantaneous current value is periodically compared (at frequent intervals) with a stored maximum current value. As the valve closes and begins to abut against the valve seat, the motor torque required for further incremental rotation of the valve stem increases abruptly, thereby causing a correspondingly abrupt increase in the current drawn by the motor. When this abrupt increase in motor current is detected, and is found to exceed the stored maximum current value, the microprocessor generates a switching signal having a second value (the "shut-off" signal), which causes the FET switch to open, thereby turning the motor off. This shut-off signal is advantageously generated after a short delay, to assure proper valve seating.

The system further comprises a low battery alarm system that senses battery voltage during motor operation, and actuates an alarm mechanism in response to low battery voltage conditions. A reset mechanism is provided to allow an operator manually to reset the microprocessor to an armed and ready condition after a low battery voltage condition is detected. The battery can be recharged by AC line current through a battery charging circuit. Solar cells can also be provided for the recharging function.

The present invention thus offers an automatic auxiliary valve shut-off system that is easily installed directly on the conventional filling/dispensing valves used with cylinders and ton containers, without adding to or modifying existing piping. The system provides an emergency shut-off function directly at the filling/dispensing valve (and therefore at the most upstream point possible) in response to any of a variety of actuation or triggering inputs, and it allows manual actuation of the valve, without disabling or affecting the automatic shut-off function. Furthermore, valve opening can only be accomplished manually, so that inadvertent automatic valve opening is avoided, yet the system returns to the automatic shut-off mode immediately upon cessation of the manual valve actuation. Moreover, the system includes means for minimizing or preventing damage due to over-driving the valve after it has engaged against its seat. In addition, the system has a reliable, self-contained power supply, with appropriate back-up and alarms, for convenient operation in the field. The entire system is compact, light-weight, and easily transportable.

These and other advantages of the present invention will be better appreciated from the detailed description that follows.

BRIEF DESCRIPTION OF THE DRAWINGS

FIG. 3 is a perspective view, partially cut away, of the motor and clutch assembly of FIG. 1 positioned for installation on a filling/dispensing valve and yoke assembly of the type used with a pressurized gas container of the cylinder or ton type;

FIG. 4 is a perspective view of the motor and clutch assembly of FIG. 1, fully assembled and installed on the filling/dispensing valve and yoke assembly; and FIG. 5 is a schematic representation of an automatic valve shut-off system in accordance with a preferred embodiment of the present invention.

DETAILED DESCRIPTION OF A PREFERRED EMBODIMENT

Figure 1:
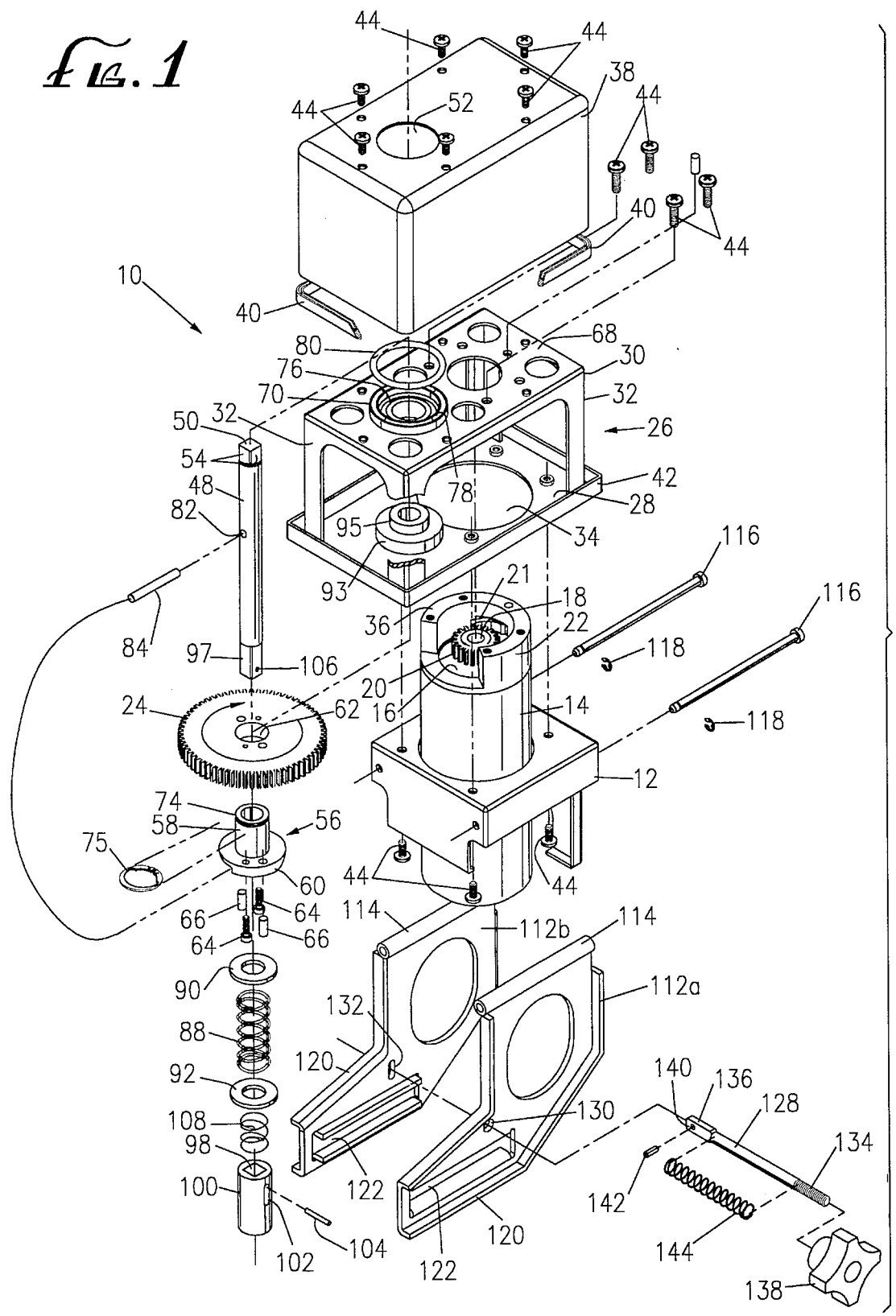
FIG. 1 is an exploded perspective view of the motor and clutch assembly used in an automatic valve shut-off system, in accordance with a preferred embodiment of the invention.

Construction of the Motor and Clutch Assembly

FIGS. 1 through 4 illustrate a motor and clutch assembly 10 used in an automatic valve shut-off system in accordance with a preferred embodiment of the present invention. A motor mount member 12 has a central aperture through which a motor casing 14 is inserted. The motor casing 14 contains a DC electric motor 16, of the commercially available type typically employed in battery-powered hand drills. A working prototype of the present invention employs the motor and triple reduction planetary gear-box from the Model 852 battery-powered drill sold by the Porter Cable Company, of Jackson, Tenn. The motor 16 has an output shaft 18 extending through the top of the casing 14 and carrying a spur-type pinion gear 20. To ensure that the shaft 18 and the pinion gear 20 can be rotated only in the counter-clockwise direction, and are locked rigidly against clockwise rotation, the casing 14 contains a spring-loaded anti-reverse pawl 21 that engages the teeth of the pinion gear 20 in conventional fashion. Attached to the top of the casing 14 and extending upwardly therefrom is a shroud 22 that concentrically surrounds the pinion gear 20, except for an opening or gap that allows a spur-type driven gear 24 to engage the pinion gear 20.

A support frame assembly 26 comprises a lower frame member 28 and an upper frame member 30, the latter being attached to and spaced from the lower frame member 28 by a plurality of vertical legs 32. The lower frame member 28 and the upper frame member 30 may be made separately and then welded together, or they may be cast as a unit. The lower frame member 28 has an aperture 34 that is coaxial with the aperture in the motor mount member 12, so as to receive the upper part of the motor casing 14, including the shroud 22, when the lower frame member 28 is fastened to the upper surface of the motor mount member 12. The shroud 22 terminates in a flattened upper edge 36 that is attached to the underside of the upper frame member 30. The support frame assembly 26 is covered by an enclosure 38 that is attached to the upper surface of the upper frame member 30. A sealing gasket 40 is advantageously captured between the outer surface of the enclosure 38 and an upturned peripheral lip 42 on the lower frame member 28 to keep out dust and moisture. The casing shroud 22, the motor mount 12, the frame assembly 26, and the enclosure 38 are advantageously formed of sheet metal, and the attachment of these components is advantageously accomplished by screws 44, as shown, or, alternatively, by equivalent means, such as rivets.

Figure 2:
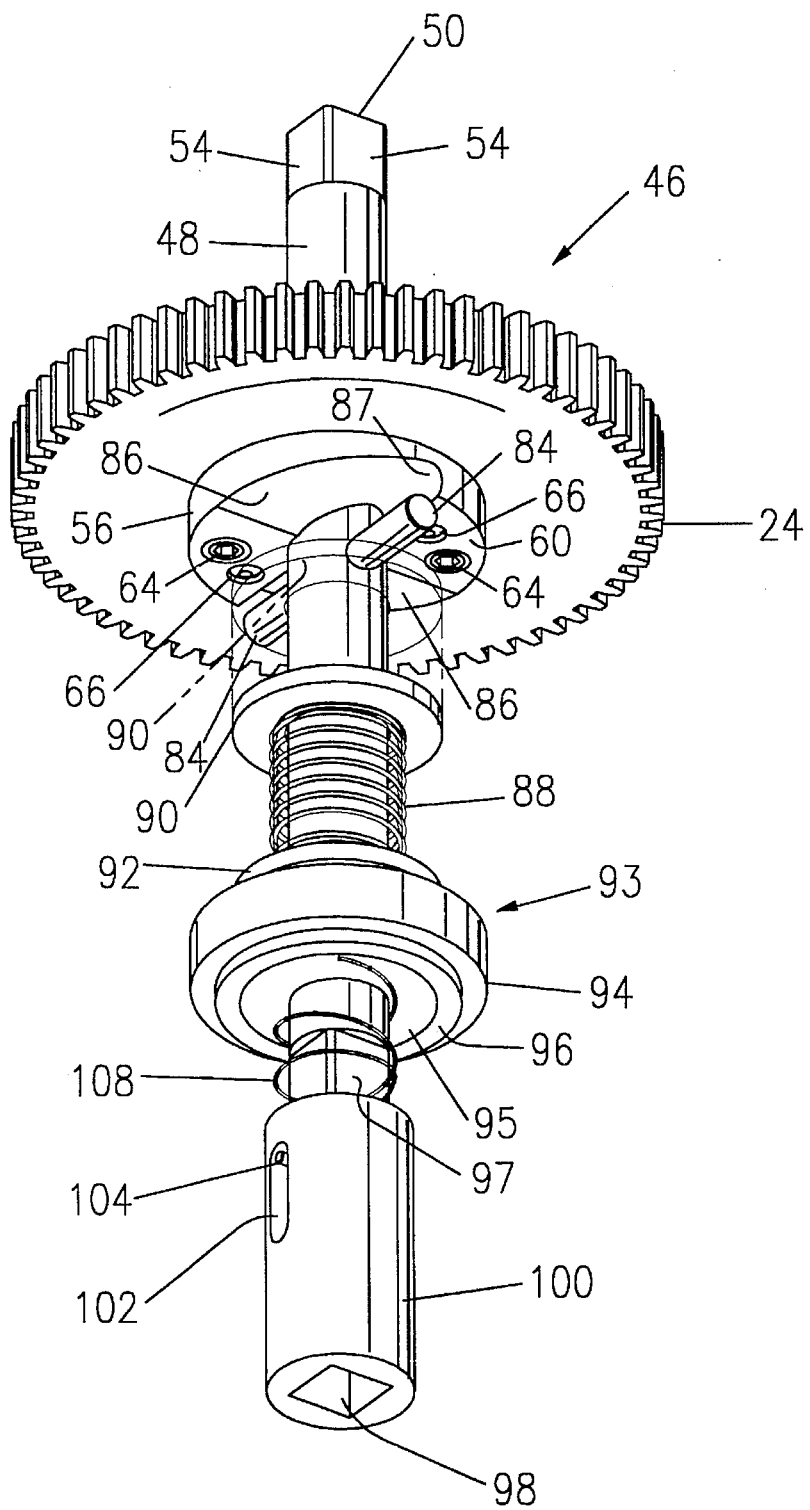
FIG. 2 is an enlarged perspective view of the clutch mechanism of the motor and clutch assembly of FIG. 1.

Referring now to FIG. 2, the driven gear 24 forms part of a clutch assembly 46 that transmits rotational torque from the pinion gear 20 on the motor shaft 18 to a valve stem of a filling/dispensing valve. The driven gear 24 is concentrically mounted on a clutch shaft 48, having an upper end 50 that extends through an aperture 52 in the top of the enclosure 38. The upper end 50 of the clutch shaft 48 is provided with flats 54, so that the clutch shaft 48 can be rotated manually with a wrench (not shown). Alternatively, the flats 54 can be used to secure a handwheel or handle (not shown), by conventional means, as is well-known in the art.

More specifically, a cog clutch member 56 has an upper surface from which a hollow cylindrical sleeve 58 extends upwardly, surrounded by an annular flange 60. The sleeve 58 is inserted through a central aperture 62 in the driven gear 24, and the clutch shaft 48 is inserted through the sleeve 58 so as to be rotatable therein. The flange 60 of the cog clutch member 56 is secured to the underside of the driven gear 24 by counter-sunk capscrews 64 and/or dowel pins 66. Alternatively, the cog clutch member 56 can be formed as an integral unit with the driven gear 24. In either case, the cog clutch member 56 provides a hub for the driven gear 24.

The sleeve 58 extends through an aperture in the top wall 68 of the upper frame member 30, and is supported for free rotation therein by an annular upper bearing and seal collar assembly. The upper bearing and seal collar assembly comprises a cast or machined upper collar 70, welded to the upper frame member 30 around the aperture formed in the top wall 68 of the upper frame member 30. The upper collar 70 accommodates a sleeve bearing 71 and press-in shaft seal 72 (FIG. 4), both of conventional design, to locate and seal around the sleeve 58 through the aperture 52 in the top of the enclosure 38. The sleeve 58 has a circumferential groove 74 near its upper end, into which is seated a snap ring 75 that seats on a central flat area 76 of the upper collar 70. The cog clutch member 56 is thus located and fixed axially or vertically by the abutment of the snap ring 75 against the central flat area 76 of the upper collar 70, and by the abutment of the upper surface of the driven gear 24 against the lower surface of the upper bearing and seal collar assembly, which extends a short distance below the top surface 68 of the upper frame member 30. Advantageously, the upper collar 70 includes an annular seal seat 78 concentrically surrounding its central area 76 and the snap ring 75 seated therein, the seal seat 78 having an annular groove into which is installed an O-ring compression gasket 80 for environmental sealing against the underside of the enclosure 38.

The clutch shaft 48 includes a narrow diametric bore 82, into which is installed a clutch pin 84, which is rigidly fixed by an interference fit within the diametric bore 82. The clutch pin 84 is centered radially, so as to have diametrically-opposed portions that protrude equally from diametrically opposite sides of the clutch shaft 48. The underside of the flange 60 of the cog clutch member 56 is formed with a pair of diametrically-opposed helical ramps 86, each of about 90 degrees of arc and terminating in diametrically-opposed arcuate abutments 87, each having a vertical or axial dimension that is greater than the radius of the clutch pin 84. Each of the diametrically-opposed portions of the clutch pin 84 is seated against one of the ramps 86. A coil-type clutch spring 88 is concentrically carried on the clutch shaft 48 between an upper washer 90 and a lower washer 92, whereby the upper washer 90 is biased to bear against the clutch pin 84, the latter thus being firmly urged into the ramps 86 on the underside of the flange 60. (As shown in FIG. 2, for the purpose of illustrating the clutch pin 84 and the ramp 86, the clutch spring 88 is artificially compressed, thereby displacing the upper washer 90 away from its normal position seated against the underside of the flange 60. The normal position of the upper washer 90 is shown in broken outline.) The lower washer 92 bears against the upper surface of an annular lower bearing and seal collar assembly 93 (best seen in FIG. 2), which is installed in an aperture in the lower frame member 28, said aperture being axially aligned with the aperture in the upper frame member 30 in which the upper bearing and seal collar assembly is installed. The lower bearing and seal collar assembly 93 is of similar construction as the upper bearing and seal collar assembly, comprising an annular lower collar 94 that accommodates a sleeve bearing 95 and a press-fit shaft seal 96.

The lower portion of the clutch shaft 48 extends through the lower bearing and seal collar assembly 93, whereby the clutch shaft 48 is supported for free rotation therein. The lower portion of the clutch shaft 48 protrudes below the lower frame member 28, and terminates in a lower end 97 of square cross section. The lower shaft end 97 is slidably received in an axial bore 98, of square cross-section, formed in a valve stem adaptor 100. The lower end of the square bore 98 is dimensioned to receive and engage with a valve stem, as described below. An axial slot 102, formed along a portion of the length of the valve stem adaptor 100, receives an adaptor stop pin 104 that is press-fit into a hole 106 in one of the flat faces of the shaft lower end 97. A coil-type adaptor spring 108 is concentrically carried on the lower portion of the clutch shaft 48, and it is seated between the upper surface of the valve stem adaptor 100 and the lower surface of the lower bearing and seal collar assembly 93, which extends a short distance below the lower frame member 28. The valve stem adaptor 100 is thus free to slide axially on the clutch shaft 48, but only between first and second axial limits established, respectively, by the upper and lower ends of the slot 102. The adaptor spring 108 weakly biases the adaptor 100 toward its first, or lowermost, limit of travel, as shown in FIG. 2.

FIGS. 1, 3, and 4 illustrate a bracket assembly by which the motor and clutch assembly 10 is attached to a typical filling/dispensing valve assembly 110. The bracket assembly comprises a pair of mounting brackets 112a, 112b. Each of the brackets 112a, 112b has a top edge, along which is provided an elongate, hollow hinge tube 114. The hinge tubes 114 are dimensioned to be received within the motor mount member 12, on opposite sides of the lower surface thereof. Each of the brackets 112a, 112b is pivotably mounted on the underside of the motor mount member 12 by a hinge pin 116, each of which passes through its associated hinge tube 114 and a pair of opposed apertures in the motor mount member 12 that respectively register with the opposite ends of the hinge tubes 114. The hinge pins 116 are secured by snap rings 118.

Each of the brackets 112a, 112b is configured with an elongate forward extension 120, each of which is provided with an elongate, substantially rectangular, horizontal slot 122. The slots 122 are dimensioned and configured to receive the opposing sides of a valve yoke 124, of the type typically employed for installing a filling/dispensing valve 126 on a pressurized gas container 127 (FIG. 3) of the cylinder or ton type, the cylinder type being shown.

Both mounting brackets 112a, 112b are traversed by a clamping screw 128, which is carried in a round hole 130 in the first bracket 112a and a vertical slot 132 in the second bracket 112b. The clamping screw 128 has a first end 134 that protrudes through the round hole 130, and a second end 136 that protrudes through the vertical slot 132. The first screw end 134 is threaded for engagement with an internally-threaded clamp knob 138, while the second screw end 136 is flattened into a rectangular cross-sectional shape that dimensionally conforms closely to the vertical slot 132 to constrain the clamping screw 128 from rotating. The flattened second screw end 136 is formed with a hole 140, into which is press-fit a dowel pin 142, located externally of the outside surface of the second bracket 112b. A coil-type clamping spring 144 is carried coaxially on the clamping screw 128 between the brackets 112a, 112b. The clamping spring 144 is slightly compressed, whereby the brackets 112a, 112b are forced apart sufficiently to bring the dowel pin 142 to bear against the outside surface of the second bracket 112b, and to bring the clamp knob 138 to bear against the outside surface of the first bracket 112a. Thus, turning the clamp knob 138 clockwise moves it inwardly along the clamping screw 128 to urge the brackets 112a, 112b (which pivot around the hinges formed by the hinge tubes 114 and the hinge pins 116) closer together, while turning the knob 138 counter-clockwise backs it outwardly along the clamping screw 128, away from the first bracket 112a, thereby allowing the clamping spring 144 to urge the brackets 112a, 112b farther away from each other.

FIGS. 3 and 4 illustrate the motor and clutch assembly 10 as installed on the valve yoke 124 and the valve 126. First, the clamp knob 138 is adjusted, as described above, to spread the brackets 112a, 112b sufficiently to allow the forward extensions 120 of the brackets 112a, 112b to be spaced farther apart than the width of the yoke 124. The valve 126 has a valve stem 146 that is then inserted into lower end of the bore 98 of the valve stem adaptor 100. The clamping knob 138 is then tightened, as described above, to lock the sides of the yoke 124 into the horizontal slots 122 in the bracket extensions 120. Variations in the distance between the top of the valve stem 146 and the sides of the yoke 124 are accommodated by the axial movement of the adaptor 100 against the force of the adaptor spring 108.

When the motor and clutch assembly 10 is installed as described above, the valve stem adaptor 100 is locked rotationally to both the valve stem 146 and to the clutch shaft 48, thereby forming, in effect, a mechanical shaft coupling. This mechanical coupling thus allows the valve stem 146 to be manually turned (to the extent allowed by the system described herein) by the application of torque to the upper end 50 of the clutch shaft 48. The valve stem adaptor 100 is, however, free to slide axially on the shaft 48 to the extent allowed by the axial slot 102 and the adaptor stop pin 104. The adaptor spring 108, bearing against the lower bearing and seal collar assembly 93 and the valve stem adaptor 100, biases the latter downwardly to maintain it in engagement with the valve stem 146, while allowing for the axial or vertical movement of the valve stem 146 when the valve 126 is opened and closed.

Operation of the Motor and Clutch Assembly

When the motor 16 is turned on (by the control system that will be described below), the pinion gear 20 is rotated in the counter-clockwise direction (as viewed from above), thereby turning the driven gear 24 and the cog clutch member 56 in the clockwise direction. The clutch shaft 48, however, is axially movable with respect to the cog clutch member 56, the axial movement being constrained by the compression of the clutch spring 88. The clutch spring 88 applies a force against the clutch pin 84, through the upper washer 90, that urges the clutch shaft 48 upwardly until the clutch pin 84 bears against the helical ramps 86 on the underside of the flange 60 of the cog clutch member 56. The clockwise rotation of the cog clutch member 56 causes the clutch pin 84 to be engaged by the abutments 87 that terminate each of the ramps 86, so that the clutch shaft 48 is turned clockwise as well. Consequently, torque is transmitted from the pinion gear 20, through the driven gear 24 and the cog clutch member 56, to the clutch shaft 48, causing the rotation of the valve stem adaptor 100, which, engaged with the valve stem 146 as described above, turns the valve stem 146 clockwise to close the valve 126.

Counter-clockwise rotation of the driven gear 24 is prevented by the engagement of the pawl 21 with the teeth of the pinion gear 20. Thus, the shaft 48 cannot manually be turned more than half a turn counter-clockwise with respect to the driven gear 24, because the clutch pin 84 will bear against the abutments 87, while the action of the pawl 21 will prevent the driven gear 24 from rotating counter-clockwise. If the shaft 48 is rotated clockwise, however, the clutch pin 84 is cammed past the abutments 87 by the ramps 86, so that the clutch shaft 48 is forced axially downwardly, against the force of the clutch spring 88 and the valve stem adaptor spring 108, thereby transmitting rotational torque to the valve stem 146, while being displaced more deeply into the axial bore 98 of the valve stem adaptor 100.

Thus, when the shaft 48 is coupled to the driven gear 24 by means of the cog clutch 56 and the clutch pin 84, manual actuation of the valve stem 146 in the counter-clockwise direction (to open the valve 126) by means of manual rotation of the shaft 48 is substantially prevented, and both manual actuation and motor-driven actuation of the valve stem 146 are possible only in the clockwise direction for closing the valve 126.

The clutch shaft 48 can, however, be decoupled from the driven gear 24 and the cog clutch member 56 by axially depressing the clutch shaft a distance sufficient to clear the clutch pin 84 from the ramps 86. At that point, the clutch shaft 48 may be freely rotated in either direction by the manual application of torque to its upper end 50, whereby the valve stem 146 may be turned so as either to open or close the valve 126. When the downwardly applied force used to depress the clutch shaft 48 is released, however, the clutch spring 88 immediately forces the clutch pin 84 back up against the ramps 86. It will then take no more than one-half turn of the cog clutch member 56 in the clockwise direction to bring the clutch pin 84 back into engagement against the abutments 87. Thus, when the clutch shaft 48 is axially depressed with respect to the driven gear 24 so as to disengage the clutch pin 84 from the cog clutch 56, the valve 126 can be either opened or closed by manual actuation, but the clutch mechanism automatically reengages for automatic operation (as will be described below) upon release of the manually-applied actuation force.

From the foregoing, it will be appreciated that the motor and clutch assembly 10 allows the valve 126 to be manually actuated either to open or close the valve, but when actuated by means of the motor 16, the valve 126 can only be closed.

The Control System

FIG. 5 schematically illustrates a control system 150 used to actuate the motor and clutch assembly 10 automatically to close the valve 126 in response to one or more types of actuation signals. The control system 150 includes electronic circuitry, described below, encased within an environmentally isolating enclosure 152 (indicated by the dashed outline), preferably having a NEMA 4× rating, with all cable entrances being maintained substantially airtight by suitable fittings (not shown), of conventional design, that likewise have a NEMA 4× rating. The enclosure 152 advantageously includes a window (not shown), for viewing the visual indicators that will be described below.

Central to the control system 150 is a microprocessor 154 that receives an electrical actuation signal generated by any one of up to several external sensors, represented diagrammatically and collectively by a box 156 in FIG. 5. One type of sensor 156 that can be used is a gas sensor, of a commercially-available type, that generates an actuation signal automatically in response to the detection of a specified gas in concentrations greater than a predetermined threshold level. Alternatively, the sensor 156 can be of the type that generates an actuation signal in response to the presence of flame, smoke, or heat, or seismic vibrations. Another suitable type of sensor 156 is a radio frequency (RF) receiver, that receives an RF signal generated by an operator-actuated remote transmitter or "kill button" (not shown), and, in response, generates the actuation signal. Still another type of sensor 156 is an infrared (IR) receiver that generates an actuation signal in response to the reception of an IR "kill button" signal.

The actuation signal generated by any sensor 156 is sensed by the microprocessor 154 as a change from a fixed, non-zero potential across the sensor (5 volts in a preferred embodiment) to a closed circuit (zero potential) condition. In essence, therefore, the actuation signal comprises a pulse of predetermined magnitude and of at least a predetermined duration. Any signal that does not meet these predetermined criteria is considered a "transient", and is detected and suppressed by a transient dampener circuit 158 of conventional design.

Upon receipt of an actuation signal, the microprocessor 154 generates a switching signal having a first or "ON" value, which is sent to a switching device 160 connecting the motor 16 to a power supply (which, in the preferred embodiment of the invention, is a battery 168 of the type described below), closing the switching device 160 to allow the motor 16 to draw current from the battery 168. The motor 16 then actuates the clutch assembly 46 in the manner described above to close the valve 126.

More specifically, in a preferred embodiment, the switching device 160 includes a field effect transistor (FET) switch, comprising two N-channel metal oxide semiconductor FETs (MOSFETs) 162, each rated at 50 amperes, connected in parallel (drain to drain and source to source), so as to have a total current capacity of 100 amperes, which is sufficient for the needs of the motor 16. Alternatively, a single 100 ampere FET could be used, if available. Of course, the switching function can be accomplished by alternative means, such as a relay, but the low power consumption and compact size of the FETs, as well as their unique output voltage characteristics (as explained below) make them particularly well-suited for use in the present invention.

In using an FET switch, as described above, it is advantageous to couple the microprocessor output (switching) signal to the FETs 162 by means of an optical isolator 164. The optical isolator 164 is a known type of device which, as employed in the present invention, is of the "Darlington" configuration, typically employed to couple circuits of different voltage potentials. In this system, the microprocessor 154 generates an output signal having a first or "ON" value of 5 volts. The optical isolator 164 converts this 5 volt microprocessor output signal first to an optical signal, and then to a 12 volt electrical switching signal that is fed to the gates of the FETs 162 to switch them to a conductive state.

With the FETs 162 switched to their conductive state, current is supplied through them to the motor 16. Also, while the FETs are conducting, an FET voltage sensor 166 detects the voltage across the FET switching device 160; that is, between the commonly-connected sources and the commonly-connected drains of the parallel FETs 162. The value of this FET output voltage, which is proportional to the current passing through the FETs, is represented by the value of a control signal generated by the voltage sensor 166, which control signal is then fed back to the microprocessor 154. The microprocessor 154 includes an electronically erasable, programmable read-only memory (EEPROM) (not shown) that has a stored value representing the known, constant resistance across the closed FET switching device 160, and it thus can compute the instantaneous value of the current drawn by the motor 16. This instantaneous current value is periodically compared (at frequent intervals) with a value representing the maximum current value, stored in the EEPROM. (Programming the microprocessor 154 to perform the above-described operations is a routine exercise for those of ordinary skill in the programming arts.) As the valve 126 closes and begins to abut against its valve seat (not shown), the motor torque required for further incremental rotation of the valve stem 146 increases abruptly, thereby causing a correspondingly abrupt increase in the current drawn by the motor 16. When this abrupt increase in motor current is detected, and is found to exceed the stored maximum current value, the microprocessor 154 generates a switching signal having a second or "OFF" value (the "shut-off" signal), which, when fed to the gates of the FETs 162, switches them to their non-conducting state, and thereby causing the switching device 160 to open, turning the motor 16 off. This shut-off signal is advantageously generated after a short delay, (preferably about 0.25 to 0.5 seconds) to assure proper valve seating, and to dampen vibrations that may occur during the seating of the valve. The microprocessor 154 then resets automatically to an "armed and ready" condition, in which it is again receptive to an actuation signal (unless there is a "low battery" condition, as described below), after a delay of about 15 seconds, to allow for the dissipation of heat from the FETs 162. When the system is in the "armed and ready" state, the microprocessor 154 actuates an "ARMED AND READY" light 167.

Power for the control system 150 and the motor 16 is provided by the battery 168, which is preferably a sealed lead-acid battery, of the type typically used in stand-by lighting systems, and rated at 12 volts and 7 ampere-hours. The battery 168 provides power for the microprocessor 154 at the required voltage as set by a microprocessor power supply 170, of conventional design. During operation of the motor 16, a battery voltage sensor 172 senses the voltage across the battery 168, and generates an output signal indicative of the battery voltage, which signal is inputted to the microprocessor 154. The value of this battery voltage signal is compared, by the microprocessor, with stored values (in the EEPROM) to determine battery capacity under load conditions. If the battery voltage signal indicates a battery voltage below a predetermined threshold voltage value (e.g., about 10.5 volts), the microprocessor generates alarm signals that are used to actuate one or more alarm devices, such as a "LOW BATTERY" light 174 and/or an audible alarm 176. Under this "low battery" condition, the microprocessor 154 cannot assume its "armed and ready" condition, as described above, unless and until a microprocessor reset switch 178 is actuated. The reset switch is contained within the enclosure 152, so that positive action is required by operating personnel in responding to, and correcting, the "low battery" condition. As long as a "low battery" condition is not detected, however, the "ARMED AND READY" light 167 remains lit.

The power supply for the control system 150 may also include a battery charger 180, which is of the commercially-available type that provides a "trickle charge" to the battery 168, such that the battery is maintained in a fully charged state. The battery charger 180 is powered principally by a 110 volt AC line source 182, which may be supplemented or replaced by a solar cell array 184. The battery charger 180 can be connected to a "power on" light 186 to indicate that it is functioning properly. Advantageously included in the battery charger 180 (but not shown in the drawing) is a temperature sensing circuit, of conventional design, that adjusts the current supplied to the battery 168 to compensate for changes in ambient temperature. This feature can extend the life of the battery 168, the capacity of which to absorb a charge is a function of ambient temperature.

It is also advantageous to include a test switch 188 outside the enclosure 152. The test switch 188 can be manually actuated to initiate a full test cycle of the valve closure operation, as described above, to assure that the system is functioning properly.

From the foregoing description, it will be appreciated that the present invention provides an automatic valve shut-off system that can be directly mounted on conventional gas filling/dispensing valves, and that performs a shut-off only function when in the automatic mode of operation, and yet which allows a manual override for manually shutting the valve off while in the automatic mode. Furthermore, the system provides a fully manual mode of operation, in which the valve can be manually opened or closed, with the system resuming its automatic mode upon termination of the manual operation. Valve closing in the automatic mode is triggered by any of several conditions sensed by the sensors 156. In the automatic mode, overdriving of the valve is prevented by the motor current sensing mechanism, comprising the FET voltage sensor 166 and the microprocessor 154 which computes a value indicative of the instantaneous measured current, compares this value to a predetermined maximum current value, and generates the "OFF" signal when the measured current value exceeds the maximum current value. The system is powered by a self-contained battery power supply that is monitored for low battery voltage, that provides an alarm and a resetable inoperable state in response to a low battery condition, and that provides for battery recharging.

All of the above-mentioned features make the present invention uniquely advantageous for in-the-field use on ton and cylinder gas containers. Moreover, the invention has much broader applications, in that it can easily be adapted for the actuation of a wide variety of valves and other mechanical control devices having rotationally-actuated control members analogous to the valve stem 146 described above.

Although a preferred embodiment of the invention has been described above, it will be appreciated that a number of variations and modifications will suggest themselves to those skilled in the pertinent arts. Such variations and modifications should be considered within the spirit and scope of the invention, as defined in the claims that follow.

What is claimed is:

1. A system for automatically actuating a valve in response to an actuation signal, comprising:

a first device that generates an actuation signal;

a second device that generates a switching signal having a first value in response to the actuation signal;

an electric motor operatively coupled to the valve;

an electrical power supply;

a switching mechanism that closes to connect the motor to the power supply in response to the first value of the switching signal; and a third device that generates a control signal having a value that is proportional to the measured value of the current drawn by the motor from the power supply through the switching mechanism when the switching mechanism is closed;

wherein the second device receives the control signal and generates a switching signal having a second value in response to a value of the control signal that is indicative of a measured current value that is greater than a predetermined current value, and wherein the switching mechanism opens to disconnect the motor from the power supply in response to the second value of the switching signal.

2. The system of claim 1, wherein the second device generates the switching signal having the second value after a predetermined time has elapsed from the reception of the control signal having a value indicative of the predetermined current value.

3. The system of claims 1 or 2, wherein the motor is coupled to the valve by means for transmitting operational torque from the motor to the valve only in a first direction that closes the valve.

4. The system of claim 3, wherein the means for transmitting includes a clutch assembly that may be operated selectively to decouple the valve from the motor to allow a manual transmission of torque to the valve both in a first direction that closes the valve, and in a second direction that opens the valve.

5. The system of claim 4, wherein the clutch assembly includes a clutch shaft, wherein the motor is coupled to the clutch assembly by a gear concentrically mounted on the clutch shaft so that the clutch shaft is axially movable, with respect to the gear, between first and second axial positions, and wherein the clutch assembly is coupled to the motor when the clutch shaft is in the first axial position, and decoupled from the motor when the clutch shaft is in the second axial position.

6. The system of claim 5, wherein the clutch shaft is biased to return to the first axial position from the second axial position.

7. The system of claim 6, wherein the gear has first and second sides and is rotatable in the first direction only, and wherein the clutch assembly further comprises:

an annular clutch element concentrically mounted on the clutch shaft and fixed to the second surface of the gear, whereby the gear and the clutch element are movable together with respect to the clutch shaft both rotationally and axially;

a camming surface on the clutch element, the camming surface terminating in an abutment;

a clutch pin fixed to the clutch shaft and extending radially therefrom so as to bear against the camming surface when the clutch shaft is in the first axial position; and spring-biased means mounted on the clutch shaft and bearing against the clutch pin so as to urge the clutch shaft toward the first axial position;

whereby, when the clutch shaft is in the first axial position, (a) the clutch pin bears against the abutment when the gear is rotated in the first direction, thereby causing the clutch shaft to rotate with the gear, and (b) the clutch shaft is urged toward the second position by the camming surface when the clutch shaft is rotated in the first direction relative to the gear; and whereby, when the clutch shaft is in the second axial position, the clutch shaft is rotatable relative to the gear selectively in either the first direction or the second direction.

8. The system of claim 7, wherein the clutch shaft has a first end and a second end, wherein the valve is actuated by a rotatable valve stem that moves in a first axial direction as it is rotated in a first rotational direction and in a second axial direction as it is rotated in a second rotational direction, and wherein the clutch assembly further comprises:

an adaptor element concentrically mounted on the second end of the shaft for axial movement relative thereto in the first and second axial directions, the adaptor element having an axial bore dimensioned to receive the valve stem for operative coupling therewith, whereby the adaptor element allows relative axial movement between the clutch shaft and the valve stem.

9. The system of claim 8, wherein the clutch shaft is rotationally mounted in a clutch shaft bearing assembly, wherein the spring biased means includes a first coil spring concentrically mounted on the clutch shaft between the clutch pin and the clutch shaft bearing assembly, and wherein the clutch assembly further comprises:

a second coil spring concentrically mounted on the clutch shaft between the clutch shaft bearing assembly and the adaptor element so as to bias the adaptor element toward the second axial direction.

10. The system of claim 9, further comprising:

an adaptor pin extending radially from the clutch shaft proximate the second end thereof; and an axial slot in the adaptor element, located and dimensioned to receive the adaptor pin, whereby the engagement of the adaptor pin in the axial slot defines first and second limits of travel for the adaptor element in the first and second axial directions, respectively.

11. The system of claim 7, wherein the camming surface comprises:

first and second helical ramps, each of about 90 degrees of arc, and respectively terminating in diametrically-opposed first and second abutments.

12. The system of claim 11, wherein the clutch pin extends radially from diametrically opposite sides of the clutch shaft, and wherein each of the abutments has an axial dimension that is greater than the diameter of the clutch pin.

13. The system of claim 1, wherein the switching mechanism includes a field effect transistor switch.

14. The system of claims 1, 2, or 13, wherein the control signal is a voltage-indicative signal representing the instantaneous voltage across the switching mechanism when the switching mechanism is closed, and wherein the second device comprises a microprocessor having a memory in which is stored (a) a resistance-indicative value representing the resistance across the switching mechanism when the switching mechanism is closed, and (b) the predetermined current value, wherein the microprocessor (i) computes a measured current value representing the instantaneous current through the switching mechanism using the stored resistance value and the received value of the control signal, (ii) compares the measure current value with the predetermined current value, and (iii) generates a switching signal having the second value in response to the measured current value exceeding the predetermined current value.

15. The system of claims 1, 2, or 13, wherein the electrical power supply comprises:

a battery;

a battery voltage sensor that generates an output signal indicative of the battery voltage; and an alarm device responsive to an alarm signal generated by the second device;

wherein the second device generates the alarm signal in response to the voltage sensor output signal having a value indicative of a battery voltage below a predetermined threshold voltage.

16. The system of claim 14, wherein the electrical power supply comprises:

a battery;

a battery voltage sensor that generates an output signal indicative of the battery voltage; and an alarm device responsive to an alarm signal generated by the microprocessor;

wherein the microprocessor generates the alarm signal in response to the voltage sensor output signal having a value indicative of a battery voltage below a predetermined threshold voltage.

17. The system of claim 16, wherein the microprocessor has a stored voltage value representing the threshold voltage, and wherein the microprocessor compares the voltage sensor output signal value with the stored voltage value, and generates the alarm signal in response to the battery voltage falling below the threshold voltage.

18. Apparatus for transmitting operational torque from a rotational driving member to a rotatable control element that is selectively coupled to and decoupled from the driving member, comprising:

means for transmitting operational torque to the control element from the driving member only in a first rotational direction for the control element when the control element is coupled to the driving member;

wherein the means for transmitting includes a clutch assembly that allows a manual transmission of torque to the control element selectively in either a first or second rotational direction when the control element is decoupled from the driving member.

19. The apparatus of claim 18, wherein the clutch assembly allows a manual transmission of torque to the control element only in a first direction while the control element is coupled to the driving member.

20. The apparatus of claim 19, wherein the clutch assembly includes a clutch shaft, wherein the driving member is coupled to the clutch assembly by a gear concentrically mounted on the clutch shaft so that the clutch shaft is axially movable, with respect to the gear, between first and second axial positions, and wherein the clutch assembly is coupled to the driving member when the clutch shaft is in the first axial position, and decoupled from the driving element when the clutch shaft is in the second axial position.

21. The apparatus of claim 20, wherein the clutch shaft is biased to return to the first axial position from the second axial position.

22. The apparatus of claim 21, wherein the gear has first and second sides and is rotatable in the first direction only, and wherein the clutch assembly further comprises:

an annular clutch element concentrically mounted on the clutch shaft and fixed to the second surface of the gear, whereby the gear and the clutch element are movable together with respect to the clutch shaft both rotationally and axially;

a camming surface on the clutch element, the camming surface terminating in an abutment;

a clutch pin fixed to the clutch shaft and extending radially therefrom so as to bear against the camming surface when the clutch shaft is in the first axial position; and spring-biased means mounted on the clutch shaft and bearing against the clutch pin so as to urge the clutch shaft toward the first axial position;

whereby, when the clutch shaft is in the first axial position, (a) the clutch pin bears against the abutment when the gear is rotated in the first direction, thereby causing the clutch shaft to rotate with the gear, and (b) the clutch shaft is urged toward the second position by the camming surface when the clutch shaft is rotated in the first direction relative to the gear; and whereby, when the clutch shaft is in the second axial position, the clutch shaft is rotatable relative to the gear selectively in either the first direction or the second direction.

23. The apparatus of claim 22, wherein the clutch shaft has a first end and a second end, wherein the control element moves in a first axial direction as it is rotated in a first rotational direction and in a second axial direction as it is rotated in a second rotational direction, and wherein the clutch assembly further comprises:

an adaptor element concentrically mounted on the second end of the shaft for axial movement relative thereto in the first and second axial directions, the adaptor element having an axial bore dimensioned to receive the control element for operative coupling therewith, whereby the adaptor element allows relative axial movement between the clutch shaft and the control element.

24. The apparatus of claim 23, wherein the clutch shaft is rotationally mounted in a clutch shaft bearing assembly, wherein the spring biased means includes a first coil spring concentrically mounted on the clutch shaft between the clutch pin and the clutch shaft bearing assembly, and wherein the clutch assembly further comprises:

a second coil spring concentrically mounted on the clutch shaft between the clutch shaft bearing assembly and the adaptor element so as to bias the adaptor element toward the second axial direction.

25. The apparatus of claim 24, further comprising:

an adaptor pin extending radially from the clutch shaft proximate the second end thereof; and an axial slot in the adaptor element, located and dimensioned to receive the adaptor pin, whereby the engagement of the adaptor pin in the axial slot defines first and second limits of travel for the adaptor element in the first and second axial directions, respectively.

26. The apparatus of claim 22, wherein the camming surface comprises:

first and second helical ramps, each of about 90 degrees of arc, and respectively terminating in diametrically-opposed first and second abutments.

27. The apparatus of claim 26, wherein the clutch pin extends radially from diametrically opposite sides of the clutch shaft, and wherein each of the abutments has an axial dimension that is greater than the diameter of the clutch pin.

28. A system for automatically actuating a valve having a rotational valve stem in response to an actuation signal, comprising:

a sensor that generates an actuation signal in response to a selected event;

a microprocessor that generates a switching signal having a first value in response to the actuation signal;

an electric motor;

torque transmission means for selectively coupling the motor to the valve stem and decoupling the motor from the valve stem, so as to transmit operational torque from the motor to the valve stem only in a first rotational direction to close the valve when the valve stem is coupled to the motor, and so as to allow a manual transmission of torque to the valve stem selectively in either a first rotational direction that closes the valve or a second rotational direction that opens the valve when the vane stem is decoupled from the motor;

an electrical power supply;

a switching mechanism that closes to connect the motor to the power supply in response to the first value of the switching signal; and a control device that generates a control signal having a value that is proportional to the measured value of the current drawn by the motor from the power supply through the switching mechanism when the switching mechanism is closed;

wherein the microprocessor receives the control signal and generates a switching signal having a second value in response to a value of the control signal that is indicative of a measured current value that is greater than a predetermined current value, and wherein the switching mechanism opens to disconnect the motor from the power supply in response to the second value of the switching signal.

29. The system of claim 28, wherein the torque transmission means allows the manual transmission of torque to the valve stem only in the first rotational direction when the valve stem is coupled to the motor.

30. The system of claim 29, wherein the torque transmission means includes a clutch shaft, wherein the motor is coupled to the clutch shaft by a gear concentrically mounted on the clutch shaft so that the clutch shaft is axially movable, with respect to the gear, between first and second axial positions, and wherein the clutch shaft is coupled to the motor when the clutch shaft is in the first axial position, and decoupled from the motor when the clutch shaft is in the second axial position.

31. The system of claim 30, wherein the clutch shaft is biased to return to the first axial position from the second axial position.

32. The system of claim 31, wherein the gear has first and second sides and is rotatable in the first direction only, and wherein the torque transmission means further comprises:

an annular clutch element concentrically mounted on the clutch shaft and fixed to the second surface of the gear, whereby the gear and the clutch element are movable together with respect to the clutch shaft both rotationally and axially;

a camming surface on the clutch element, the camming surface terminating in an abutment;

a clutch pin fixed to the clutch shaft and extending radially therefrom so as to bear against the camming surface when the clutch shaft is in the first axial position; and spring-biased means mounted on the clutch shaft and bearing against the clutch pin so as to urge the clutch shaft toward the first axial position;

whereby, when the clutch shaft is in the first axial position, (a) the clutch pin bears against the abutment when the gear is rotated in the first direction, thereby causing the clutch shaft to rotate with the gear, and (b) the clutch shaft is urged toward the second position by the camming surface when the clutch shaft is rotated in the first direction relative to the gear; and whereby, when the clutch shaft is in the second axial position, the clutch shaft is rotatable relative to the gear selectively in either the first direction or the second direction.

33. The system of claim 32, wherein the clutch shaft has a first end and a second end, wherein the rotatable valve stem moves in a first axial direction as it is rotated in the first rotational direction and in a second axial direction as it is rotated in the second rotational direction, and wherein the torque transmission means further comprises:

an adaptor element concentrically mounted on the second end of the shaft for axial movement relative thereto in the first and second axial directions, the adaptor element having an axial bore dimensioned to receive the valve stem for operative coupling therewith, whereby the adaptor element allows relative axial movement between the clutch shaft and the valve stem.

34. The system of claim 33, wherein the clutch shaft is rotationally mounted in a clutch shaft bearing assembly, wherein the spring biased means includes a first coil spring concentrically mounted on the clutch shaft between the clutch pin and the clutch shaft bearing assembly, and wherein the torque transmission means further comprises:

a second coil spring concentrically mounted on the clutch shaft between the clutch shaft bearing assembly and the adaptor element so as to bias the adaptor element toward the second axial direction.

35. The system of claim 34, further comprising:

an adaptor pin extending radially from the clutch shaft proximate the second end thereof; and an axial slot in the adaptor element, located and dimensioned to receive the adaptor pin, whereby the engagement of the adaptor pin in the axial slot defines first and second limits of travel for the adaptor element in the first and second axial directions, respectively.

36. The system of claim 32, wherein the camming surface comprises:

first and second helical ramps, each of about 90 degrees of arc, and respectively terminating in diametrically-opposed first and second abutments.

37. The system of claim 36, wherein the clutch pin extends radially from diametrically opposite sides of the clutch shaft, and wherein each of the abutments has an axial dimension that is greater than the diameter of the clutch pin.

38. The system of claims 28, 29, 30, 31, 32, 33, 34, 35, 36, or 37, wherein the control signal is a voltage-indicative signal representing the instantaneous voltage across the switching mechanism when the switching mechanism is closed, and wherein the microprocessor has a memory in which is stored (a) a resistance-indicative value representing the resistance across the switching mechanism when the switching mechanism is closed, and (b) the predetermined current value, wherein the microprocessor (i) computes a measured current value representing the instantaneous current through the switching mechanism using the stored resistance value and the received value of the control signal, (ii) compares the measure current value with the predetermined current value, and (iii) generates a switching signal having the second value in response to the measured current value exceeding the predetermined current value.

39. The system of claims 28, 29, 30, 31, 32, 33, 34, 35, 36, or 37, wherein the electrical power supply comprises:

a battery;

a battery voltage sensor that generates an output signal indicative of the battery voltage; and an alarm device responsive to an alarm signal generated by the microprocessor;

wherein the microprocessor generates the alarm signal in response to the voltage sensor output signal having a value indicative of a battery voltage below a predetermined threshold voltage.

40. The system of claim 38, wherein the electrical power supply comprises:

a battery;

a battery voltage sensor that generates an output signal indicative of the battery voltage; and an alarm device responsive to an alarm signal generated by the microprocessor;

wherein the microprocessor generates the alarm signal in response to the voltage sensor output signal having a value indicative of a battery voltage below a predetermined threshold voltage.

41. The system of claim 39, wherein the microprocessor has a stored voltage value representing the threshold voltage, and wherein the microprocessor compares the voltage sensor output signal value with the stored voltage value, and generates the alarm signal in response to the battery voltage falling below the threshold voltage.

42. The system of claim 40, wherein the microprocessor has a stored voltage value representing the threshold voltage, and wherein the microprocessor compares the voltage sensor output signal value with the stored voltage value, and generates the alarm signal in response to the battery voltage falling below the threshold voltage.

* * * * *